(12) United States Patent
Sekii

(10) Patent No.: US 6,385,149 B1
(45) Date of Patent: May 7, 2002

(54) DISC PLAYER, AND DISC PLAYBACK METHOD

(75) Inventor: Yasuaki Sekii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/396,322

(22) Filed: Sep. 15, 1999

(30) Foreign Application Priority Data

Sep. 16, 1998 (JP) ............................................ 10-262000

(51) Int. Cl.[7] ................................................. G11B 7/00
(52) U.S. Cl. ................................ 369/47.15; 369/53.37; 369/59.13
(58) Field of Search ........................... 369/47.15, 47.24, 369/53.37, 59.13

(56) References Cited

U.S. PATENT DOCUMENTS 5,712,838 A * 1/1998 Inazawa et al. ........... 369/47.15

FOREIGN PATENT DOCUMENTS

| EP | 3181068 | 8/1991 | ........... G11B/20/10 |
| EP | 5252477 | 9/1993 | ............ H04N/5/92 |
| EP | 0758125 | 2/1997 | ........... G11B/20/10 |

* cited by examiner

Primary Examiner—Nabil Bindi
(74) Attorney, Agent, or Firm—Jay H. Maioli

(57) ABSTRACT

A disc player for selectively reading a multi-bit digital signal obtained by sampling with a sampling signal Fs and a one-bit digital signal obtained by sampling with a sampling signal n×Fs (n is an integer larger than 2), is adapted to control, when one of the digital signals is selected for reading, a signal processing circuit for the other non-selected digital signal to stand in a power saving mode, thereby permitting a longer life for the disc player and the processing circuit of the non-selected digital signal.

17 Claims, 3 Drawing Sheets

DISC PLAYER, AND DISC PLAYBACK METHOD

BACKGROUND OF THE INVENTION

1. Field of the Invention

The present invention relates to a disc player adapted to selectively read first and second layers formed in a disc, the first layer having recorded therein multi-bit digital signal obtained by sampling with a sampling signal Fs while the second layer has recorded therein one-bit digital signal obtained by sampling with a sampling signal n×Fs (n is an integer larger than 2).

The present invention relates also to a disc player adapted to selectively read first and second types of discs, the first type of disc having recorded therein multi-bit digital signal obtained by sampling with a sampling signal Fs while the second type of disc has recorded therein one-bit digital signal obtained by sampling with a sampling signal n×Fs (n is an integer larger than 2).

2. Description of Related Art

Generally, a disc player for playback of optical discs, typically, compact discs (CD; will be referred to as "CD disc" hereinafter for the convenience of illustration and explanation), comprises an optical pickup to read information recorded with pits in the disc, RF amplifier to amplify RF signal, servo control circuit, mechanical drive circuit, digital signal processing circuit, DA converter, analog audio circuit, etc.

For playback of an optical disc, a laser light is first generated at the optical pickup, it is irradiated onto the disc, and the RF amplifier produces various servo signals based on a reflected light from the disc surface. The servo control signals include a focus servo signal according to which the laser is focused onto a pit on the disc, a tracking servo signal to allow the laser spot focused on the disc surface to track a succession of pits, a spindle servo signal which is a clock component extracted from a signal produced by binary-coding of an RF signal and according to which the disc rotation or spinning is controlled, and a sled servo signal to allow the optical pickup to move radially of the disc.

After the servo control circuit and mechanical drive circuit operate correctly, a signal read from the disc is subjected to EFM demodulation (eight-fourteen demodulation) in the digital signal processing circuit, has an error corrected, and then it is subject to digital/analog conversion in the DA converter to provide an analog audio signal.

Recently, however, a standard for high-density recording optical discs as new audio optical discs has been proposed which are different from that for the conventional CD discs.

The high-density recording optical discs (will be referred to as "HD disc" hereinafter) prescribed in the standard is adapted to record one-bit audio signal produced by a delta-sigma ($\Delta\Sigma$) modulation of analog audio signal.

In the delta-sigma modulation, a signal is converted using an extremely high sampling frequency, for example, a frequency 64 times higher than the sampling frequency of 44.1 kHz for the conventional CD discs.

The one-bit signal will be referred to as "high speed one-bit audio signal" hereinafter.

In the delta sigma modulation, a very high frequency is used to sample a signal and a quantization bit is represented by one bit having a very short data length, so that the transmission frequency bandwidth for the delta sigma modulation is wide.

Also in the delta sigma modulation, a high dynamic range can be assured in an audio bandwidth lower than the oversampling frequency 64 times higher than the sampling frequency for the conventional CD discs.

Audio signals conforming to the above standard will be referred to as "HD signal" hereinafter. The specifications of a conventional CD disc and HD disc will be described with reference to Table 1 below.

TABLE 1

| Items | CD disc | HD disc |
| --- | --- | --- |
| Disc diameter | 12 cm | 12 cm |
| Disc thickness | 1.2 mm | 1.2 mm |
| Standard reading wavelength | 780 nm | 650 nm |
| Standard scanning speed | 1.25 m/s | 3.94 m/s |
| Shortest pit length | 0.87 µm | 0.4 µm |
| Track pitch | 1.6 µm | 0.74 µm |
| Signal format | PCM | DSD |
| Sampling frequency | 44.1 kHz | 2.8224 MHz |
| No. of quantization bits | 16 | 1 |
| Modulation method | EFM | EFM+ |
| ECC | CIRC | PC-RS |

As seen from Table 1, the HD disc has the same diameter and thickness of 12 cm and 1.2 mm, respectively, as the conventional CD.

In the optical recording/reproduction system for the CD signal, the read wavelength is 780 nm, standard scanning speed (relative linear velocity) is 1.25 m/s, shortest pit length is 0.87 µm and track pitch is 1.6 µm.

On the other hand, in the optical recording/reproduction system for the HD signal, the read wavelength is 650 nm, standard scanning speed (relative linear velocity) is 3.94 m/s, shortest pit length is 0.4 µm and track pitch is 0.74 µm.

For signal processing, the PCM (pulse code modulation) method is used for the CD signal while the DSD (direct stream digital) method is used for the HD disc. The standard sampling frequency for the CD signal is 44.1 kHz, and that for the HD signal is 2.8224 MHz for multiple quantization bits. The number of quantization bits is 16 for the CD signal but 1 for the HD signal.

Further, the modulation method adopted for the CD signal is EFM while that for the HD signal is EFM+1. Also, the ECC (error correction coding) method for the CD signal recording disc is CIRC (cross interleave Reed-Solomon coding), and that for the HD disc is PC (product code)-RS (Reed-Solomon).

Therefore, a disc player compatible with both CD and HD discs (will be referred to as "CD/HD player" hereinafter) will be considered below. Since both the HD disc and CD disc have the same shape, a disc rotation driving mechanism can be used in common to drive them. Therefore, the spindle/sled servo control system is compatible with both the HD disc and CD disc.

However, since the optical recording/reproduction and signal processing methods for the HD disc are different from those for the CD disc, an optical pickup, RF amplifier, and signal processing circuits for modulation, DA conversion, etc. for the HD disc should be uniquely designed for each of the HD and CD discs. An analog audio circuit can be used for both the HD and CD discs if the disc player has a single output terminal.

Thus, such CD/HD players have been proposed each of which has common circuits for both the discs and dedicated circuits for the respective discs.

However, only a single disc can be set and played in the CD/HD player at a time. When a CD disc, for example, is played in the CD/HD player, the dedicated circuits for the other type of disc, namely, an HD disc, are also always energized and in active status unless any countermeasures are taken. The disc player as a whole will consume a larger amount of power, and the active status of the dedicated circuits for the other type of disc will cause the disc player to malfunction and cause a noise to adversely affect the circuits in operation for the disc being played in the disc player.

Especially in a CD/HD player designed for a high-fidelity audio playback, clock oscillation at the dedicated circuits for the type of disc other than currently played in the player will have an adverse affect on the reproduced sound quality.

SUMMARY OF THE INVENTION

Accordingly, the present invention has an object to overcome the above-mentioned drawbacks of the prior art by providing a disc player compatible with more than one type of audio optical disc having signals recorded thereon based on the different optical recording methods, respectively, and which can be driven by the same driving mechanism, the disc player being adapted to control, during playback of a selected one of the different types of discs, the signal processing system for the other type of disc not currently being played to stand in a power saving mode in order to minimize the power consumption of the disc player as a whole, and prevent malfunction of the circuitry being energized but not in use for the disc currently being played and a noise from coming into the circuitry used for the disc currently being played.

The above object can be attained by providing a disc player to selectively read a first digital signal of m quantization bits (m is an integer larger than or equal to 2) sampled with a sampling frequency Fs (Hz) and a second digital signal of one quantization bit sampled with a sampling frequency n×Fs (Hz) (n times of the sampling frequency Fs (Hz); n is an integer larger than or equal to 2), the disc player comprising according to the present invention:

a first means for processing the first digital signal;

a second means for processing the second digital signal; and means for providing, during reading either of the first and second digital signals, a control to minimize the power consumption of the signal processing means for the other digital signal.

Also the above object can be attained by providing a player for a disc-like recording medium having a first layer having recorded thereon a first digital signal of m quantization bits (m is an integer larger than or equal to 2) sampled with a sampling frequency Fs (Hz) and a second layer having recorded thereon a second digital signal of one quantization bit sampled with a sampling frequency n×Fs (Hz) (n times of the sampling frequency Fs (Hz); n is an integer larger than or equal to 2), the player comprising according to the present invention:

means for selecting either of the first and second layers for signal read therefrom;

a first means for processing the first digital signal recorded on the first layer;

a second means for processing the second digital signal recorded on the second layer; and means for providing, during reading the digital signal recorded on one of the first and second layers selected by the selecting means, a control to minimize the power consumption of the signal processing means for the digital signal recorded on the other layer.

Also the above object can be attained by providing a disc playback method of selectively reading a first type of disc having recorded thereon a first digital signal of m quantization bits (m is an integer larger than or equal to 2) sampled with a sampling frequency Fs (Hz) and a second type of disc having recorded thereon a second digital signal of one quantization bit sampled with a sampling frequency n×Fs (Hz) (n times of the sampling frequency Fs (Hz); n is an integer larger than or equal to 2), the method comprising, according to the present invention, the steps of:

discriminating a disc going to be read between the first and second types;

controlling, when the disc is judged to be the first type one, a signal processing system for the second digital signal to stand in a power saving mode; and controlling, when the disc is judged to be the second type one, a signal processing system for the first digital signal to stand in a power saving mode.

In the above disc player and method, since either of the digital audio signals or either of the discs cannot be read at a time, the signal processing system for the other digital audio signal or disc has not to be in the active status. Therefore, according to the present invention, the signal processing system for the disc or audio signal not currently being read is controlled to stand in the power saving mode.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The present invention will be further described concerning a disc player compatible with two types of optical discs. The disc player is adapted to selectively read a compact disc (CD; will be referred to as "CD disc" hereinafter for the convenience of illustration and explanation) and a high-density recording optical disc and/or an optical disc having CD signal recorded on a first layer thereof while having HD signal recorded on a second layer thereof.

The CD disc refers herein to an optical disc having recorded therein a first audio signal of 16 quantization bits sampled with a sampling frequency of 44.1 kHz.

On the other hand, the high-density (HD) recording optical disc refers herein to an optical disc having a second digital audio signal of one quantization bit sampled with a sampling frequency of 64×44.1 kHz (will be referred to as "HD signal" hereinafter).

Figure 1:
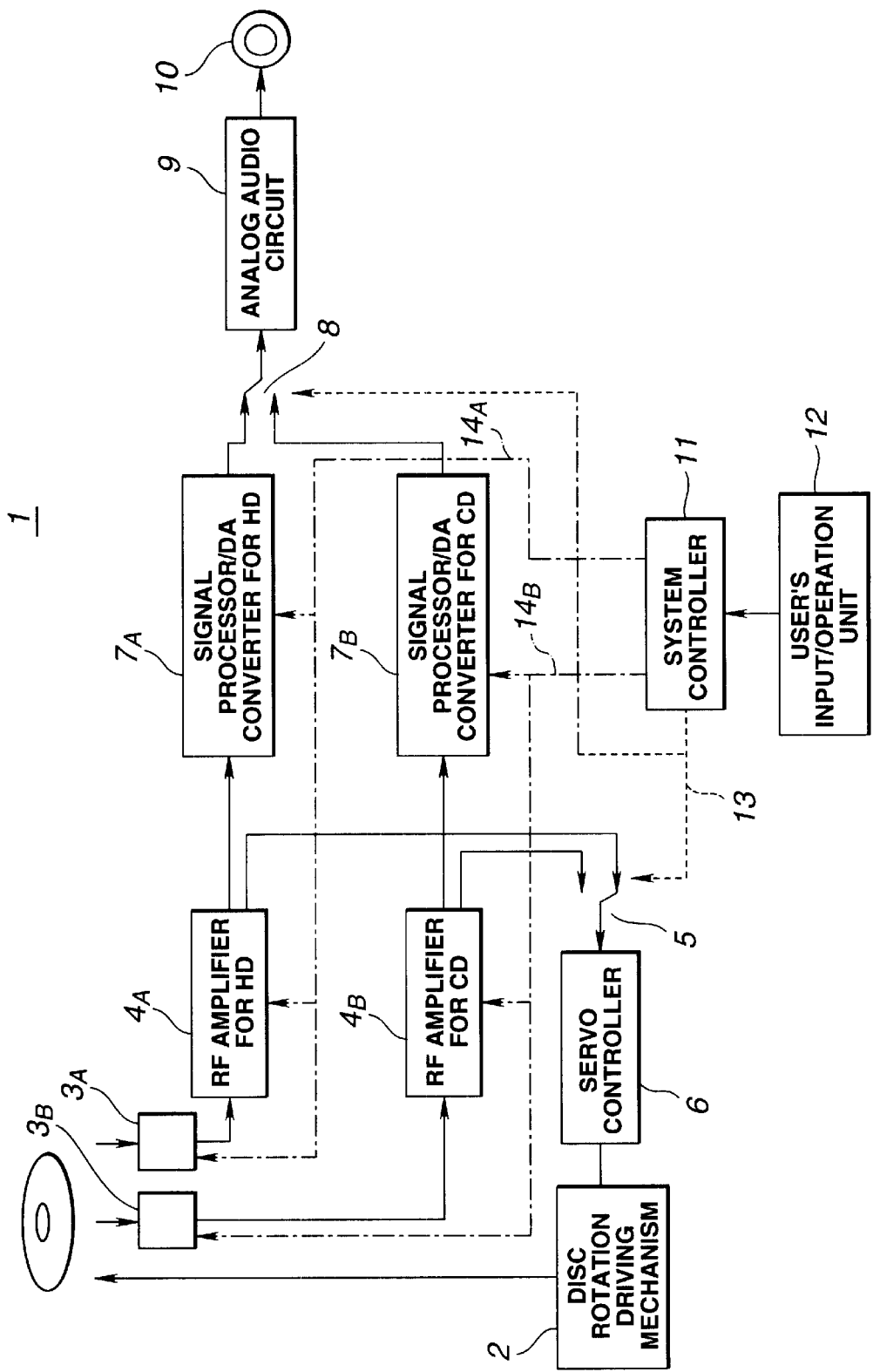
FIG. 1 is a block diagram of an embodiment of disc player according to the present invention.

Referring now to FIG. 1, there is schematically illustrated in the form of a block diagram an embodiment of a disc player compatible with the above-mentioned three types of discs according to the present invention. The disc player is generally indicated with a reference 1.

The disc player 1 comprises a disc rotation driving mechanism 2 consisting of a motor provided with a turntable adapted to receive each of the three types of optical discs to drive any of such optical discs mounted thereon.

The disc player 1 further comprises an optical pickup 3A for HD signal. The HD optical pickup 3A emits a laser light of 650 nm in standard read wavelength as shown in Table 1 to an HD signal recording area on an HD disc, and detects an RF signal from a return light from the HD disc. The disc player 1 also comprises an optical pickup 3B for CD signal. The CD optical pickup 3B emits a laser light of 780 nm in read wavelength as also shown in Table 1 to a CD signal recording area on a CD disc, and detects an RF signal from a return light from the CD disc surface.

The HD optical pickup 3A and CD optical pickup 3B are connected to an RF amplifier 4A for HD signal and an RF amplifier 4B for CD signal, respectively.

The HD and CD RF amplifiers 4A and 4B are dedicated for use with the HD and CD discs, respectively, to provide main disc content signal and servo signals.

The servo signals from each of the HD and CD RF amplifiers 4A and 4B are connected to a servo signal select switch 5. A servo signal selected by the servo signal select switch 5 is supplied to a servo controller 6.

The servo controller 6 controls and drives the disc rotation driving mechanism 2 according to the servo signal selected by the servo signal select switch 5 and supplied thereto.

Also, main signals from the HD and CD RF amplifiers 4A and 4B, respectively, are supplied to a signal processor/DA converter 7A for HD signal and signal processor/DA converter 7B for CD signal, respectively. Based on the corresponding specific signal processing methods shown in Table 1, the HD signal processor/DA converter 7A and CD signal processor/DA converter 7B process the main signals from the HD and CD RF amplifiers 4A and 4B, respectively, to generate audio signals, respectively, which will be supplied to an output select switch 8.

The output select switch 8 selects either of the supplied audio signals for delivery to an analog audio circuit 9.

The disc player 1 has an output terminal 10 at which audio signal, CD or HD, is delivered.

The display player 1 comprises also a system controller 11 which supplies various control signals to the CD optical pickup 3B, CD RF amplifier 4B and CD signal processor/DA converter 7B and to the HD optical pickup 3A, HD RF amplifier 4A and HD signal processor/DA converter 7A to control he operation and power supply mode of these components. The system controller 11 controls also the operation of the servo and output signal select switches 5 and 8.

The disc player 1 has also a user's input/operation unit 12 for the user to select a disc of his or her desired type for playing and start/stop the disc playing in the disc player 1.

In particular, the system controller 11 controls, when one of the CD and HD signal processing systems is put into operation, the other signal processing system to stand in a power saving mode.

In the disc player 1, the optical pickup 3A, RF amplifier 4A, and signal processor/DA converter 7A form together a dedicated circuit for the HD disc while the optical pickup 3B, RF amplifier 4B, and signal processor/DA converter 7B form together a dedicated circuit for the CD disc, and the other component circuits are commonly used for both the HD and CD discs.

The disc player 1 constructed as in the above operates as will be described below:

When the user wants to play an HD disc with the disc player 1, he uses the input/operation unit 12 to give a HD select/start command to the disc player 1.

Then, the system controller 11 will set the servo and output signal select switches 5 and 8 in positions, respectively, for a HD route via an HD/CD select line 13. Thus, from the HD disc set in the disc rotation driving mechanism 2, servo signals are transmitted to the servo controller 6 and main disc content is transmitted to the HD signal processor/DA converter 7A, via the HD optical pickup 3A and HD RF amplifier 4A.

Supplied with the main disc content, the HD signal processor/DA converter 7A provides an analog audio signal which will be delivered at the output terminal 10 via the analog audio circuit 9.

At this time, the system controller 11 controls, via a CD control line 14B, the CD optical pickup 3B, CD RF amplifier 4B and CD signal processor/DA converter 7B to stand in the power saving mode, respectively.

On the other hand, when the user wants to play a CD disc with the disc player 1, he uses the input/operation unit 12 to give a CD select/start command to the disc player 1. As mentioned above, the system controller 11 will set the servo and output signal select switches 5 and 8 in positions, respectively, for a CD route. Thus, from the CD disc, signals are passed through the CD optical pickup 3B, CD RF amplifier 4B, CD signal processor/DA converter 7B, further passed through the analog audio circuit 9 and then delivered as an audio signal at the output terminal 10. At this time, the system controller 11 controls, via a HD control line 14A, the HD optical pickup 3A, HD RF amplifier 4A and HD signal processor/DA converter 7A to stand in the power saving mode, respectively.

Also, according to the present invention, the disc player 1 may be adapted to automatically discriminate a disc set in the disc rotation driving mechanism 2 between the HD and CD types without the selection of a disc type by the user using the input/operation unit 12, and control the optical pickup, RF amplifier and signal processor/DA converter to stand in the power saving mode. Note that the disc player 1 may further be adapted such that in addition to the HD and CD discs, a hybrid optical disc having CD and HD signals recorded thereon (will be referred to as "CD/HD multi-layer or hybrid disc" hereinafter) can be discriminated. In this case, the CD and HD discs may be called a CD single-layer disc and an HD single-layer disc, respectively.

The hybrid optical disc, namely, the CD/HD multi-layer disc, comprises an HD signal layer and a CD signal layer formed one on the other. Signals recorded on the CD signal layer fully conform to the compact disc (CD) standard and can be read using a laser light emitted from the CD optical pickup 4B of the disc player 1.

On the other hand, a signal on the HD signal layer is read with a laser light emitted from the HD optical pickup 4A of the disc player 1. Normally, the hybrid optical disc has the two layers, namely, HD and CD signal layers formed one on the other in this order as counted from the optical pickup. The HD signal layer is formed from a translucent material through which a laser light of 780 nm in wavelength can be transmitted but a laser light of 650 nm cannot.

Figure 2:
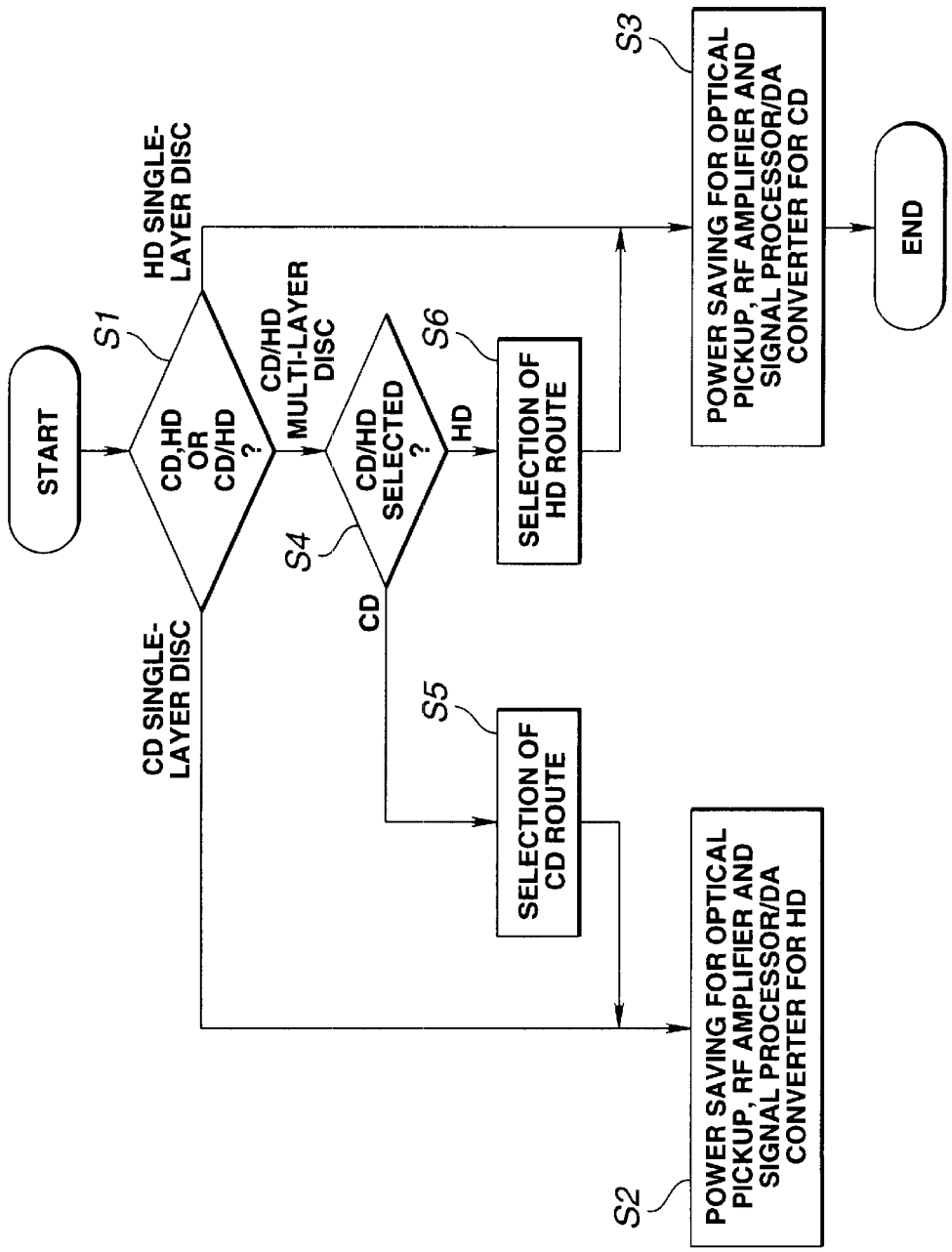
FIG. 2 is a functional flow chart of operations of the disc player in FIG. 1 in automatic disc discrimination and power saving control for each of the discs.

FIG. 2 is a flow chart of operations in automatic disc discrimination and power saving for each type of disc discriminated in the disc player 1.

First at step S1, an optical disc set in the disc rotation driving mechanism 2 of the disc player 1 is discriminated among three types, CD, HD and CD/HD. More specifically, a laser light is emitted from each of the HD and CD optical pickups 3A and 3B. If a signal is detected from a return component of each of laser lights irradiated to the disc surface, the optical disc is judged to be a CD/HD hybrid disc. If a signal is detected from a return component of only one of the laser lights irradiated to the disc surface, it can automatically be determined that the optical disc is either a CD or HD single-layer disc.

Now, if the disc set in the disc rotation driving mechanism 2 is judged at step S1 to be a CD single-layer disc, for example, the operating procedure goes to step S2 where the two select switches 5 and 8 are set in positions, respectively, for the CD route, and thus signal from the CD disc is passed through the CD optical pickup 3B, CD RF amplifier 4B and CD signal processor/DA converter 7B, further passed through the analog audio circuit 9 and then delivered as an audio signal at the output terminal 10.

At this time, the system controller 11 will control, via the HD control line 14A, the HD optical pickup 3A, HD RF amplifier 4A and HD signal processor/DA converter 7A to stand in the power saving mode.

On the contrary, if the optical disc set in the disc rotation driving mechanism 2 is judged at step S1 to be an HD single-layer disc, the operating procedure goes to step S3 where the two select switches 5 and 8 are set in positions, respectively, for the HD route, and thus signal from the HD disc is passed through the HD optical pickup 3A, HD RF amplifier 4A and HD signal processor/DA converter 7A, further passed through the analog audio circuit 9 and then delivered as an audio signal at the output terminal 10.

At this time, the system controller 11 will control, via the CD control line 14B, the CD optical pickup 3B, CD RF amplifier 4B and CD signal processor/DA converter 7B to stand in the power saving mode.

Further, if the optical disc set in the disc rotation driving mechanism 2 is judged at step S1 to be a CD/HD hybrid disc, the operating procedure goes to step S4 where a signal layer selected by the user is discriminated between CD and HD.

If the signal layer selected by the user is judged at S4 to be a CD signal layer, for example, the operating procedure goes to Step S5 where the two select switches 5 and 8 are set in positions, respectively, for the CD route, and thus signal from the CD disc is passed through the CD optical pickup 3B, CD RF amplifier 4B and CD signal processor/DA converter 7B, further passed through the analog audio circuit 9 and then delivered as an audio signal at the output terminal 10.

At this time, the system controller 11 will control, via the HD control line 14A, the HD optical pickup 3A, HD RF amplifier 4A and HD signal processor/DA converter 7A to stand in the power saving mode.

On the contrary, if the signal layer selected by the user is judged at step S4 to be an HD signal layer, the operating procedure goes to step S6 where the two select switches 5 and 8 are set in positions, respectively, for the HD route, and thus signal from the HD disc is passed through the HD optical pickup 3A, HD RF amplifier 4A and HD signal processor/DA converter 7A, further passed through the analog audio circuit 9 and then delivered as an audio signal at the output terminal 10.

At this time, the system controller 11 will control, via the CD control line 14B, the CD optical pickup 3B, CD RF amplifier 4B and CD signal processor/DA converter 7B to stand in the power saving mode.

Figure 3:
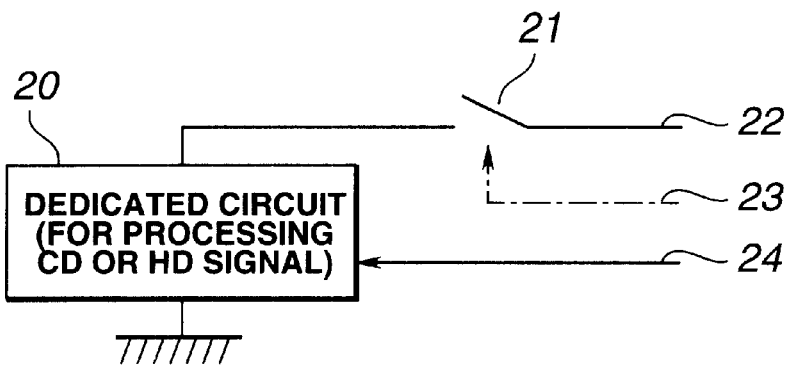
FIG. 3 shows a first method of controlling a dedicated circuit for each of the CD and HD types of discs in FIG. 1 to stand in the power saving mode.

How a dedicated circuit 20 for each of the CD and HD discs is controlled to stand in the power saving mode will further be described below concerning some examples with reference to FIGS. 3 to 5:

FIG. 3 shows a first method of controlling the dedicated circuit 20 to stand in the power saving mode. For this method, the dedicated circuit 20 (CD or HD signal processor) is provided with a switch 21 in a power line 22 connected thereto, as shown. There are provided a control line 23 (HD or CD control line 14A or 14B) and a clock line 24. In this method, the switch 21 in the power line 22 is opened by the control line 14A or 14B to shut off the power supply itself. The dedicated circuit 20 is supplied with only an operation clock over clock line 24 but thus not with a power. Therefore, the dedicated circuit cannot substantially operate but will stand in the power saving mode.

Figure 4:
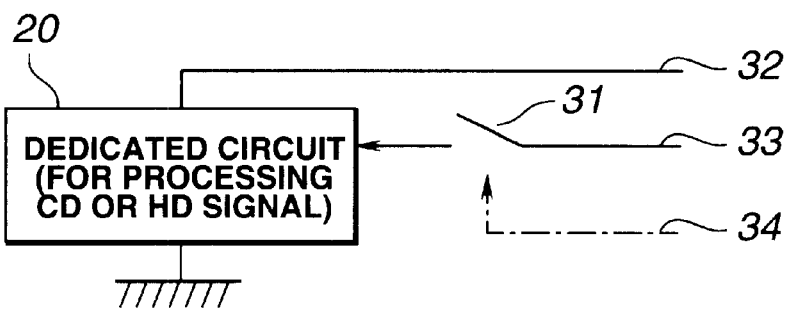
FIG. 4 shows a second method of controlling the dedicated circuit in FIG. 1 to stand in the power saving mode.

FIG. 4 shows a second method of controlling the dedicated circuit 20 to stand in the power saving mode. For this second method, there are provided a switch 31, power line 32, clock line 33 and a control line 34 (HD or CD control line 14A or 14B) for the dedicated circuit 20 as shown in FIG. 4. The switch 31 is connected in the clock line 33. The switch 31 is opened by the control line 34 to shut off the supply of operation clock while the power line 32 is kept connected to the dedicated circuit 20. Therefore, the dedicated circuit 20 is supplied with a power but with no operation clock, so it cannot substantially operate but thus stand in the power saving mode.

Figure 5:
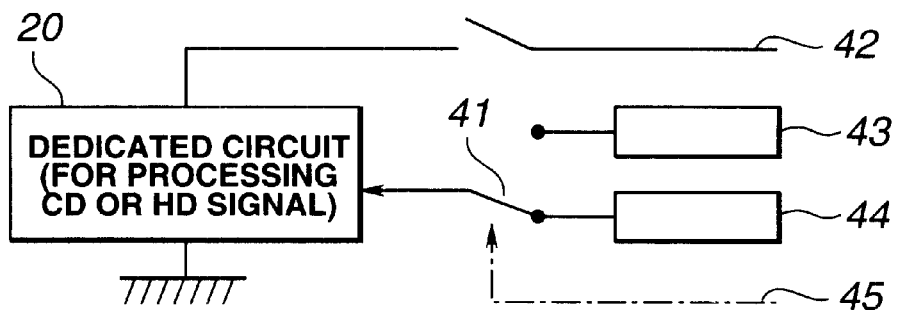
FIG. 5 shows a third method of controlling the dedicated circuit in FIG. 1 to stand in the power saving mode.

FIG. 5 shows a third method of controlling the dedicated circuit 20 to stand in the power saving mode. For this method, a switch 41, power line 42, oscillator 43 which always generate clock signals, low-frequency oscillator 44 which generates a clock signal lower in frequency than the clock signal generated by the oscillator 43, and a control line 45 (HD or CD control line 14A or 14B). By this method of setting the power saving mode, the switch 41 is connected in a line connected between the dedicated circuit 20 and low-frequency oscillator 43, and controlled by the control line 45 to change the oscillator 43 over to the oscillator 44. Namely, the dedicated circuit 20 is not completely stopped from operating, but the power consumption by the semiconductor circuits is reduced.

Each of the above methods can attain the power saving by placing in an inactive status the dedicated circuit 20 for other than a disc or signal layer to be read while not allowing it to operate in the normal mode. It should be noted that this power saving can be attained also by transferring an inactivation command such as an off command or sleep command to the dedicated circuit 20 over the control line to shift the dedicated circuit 20 to the power saving mode.

In the disc player 1 having been described in the foregoing, while a selected one of more than one type of audio optical disc, including CD and HD discs having signals recorded thereon based on different optical recording methods, respectively, and a hybrid disc set on the same disc rotation driving mechanism 2, is being played or while read is being made from one of the signal layers of the hybrid disc, the electrical signal detecting means such as the optical pickup, electrical signal amplifying means such as the RF amplifier and electrical signal processing means such as the signal processor/DA converter for the other types of discs or for other signal layer in the hybrid disc are set in the power saving mode, so that it is possible to minimize the power consumption of the disc player 1 as a whole, prevent dissipation of excessive heat, prevent a malfunction from being caused by a energized portion of the disc player circuitry other than destined for the optical disc or signal layer not currently being played or read, and prevent a noise from coming into the portion of the circuitry for the optical disc or signal layer being currently played or read.

Generally, it is said about audio disc players that energization and activation of a circuit block of the disc player, not required for other than a disc or signal layer being currently played or read, will arise an excessive heating and noise which will have adverse influence on the sound quality of reproduced audio signal. Therefore, the present invention can effectively eliminate such influences in a high-fidelity disc player.

It should be noted that although the disc player according to the present invention having been described with reference to FIG. 1 in the foregoing uses two different optical pickups for HD and CD discs, respectively, a single optical pickup can technically be implemented which generates a laser light of a shorter wavelength for compatibility with both HD and CD discs.

Similarly, a one-bit type DA converter, if used in the signal processor/DA converter, will be compatible with both the HD and CD discs. Thus, grouping of the disc player components into a dedicated block and versatile block depends upon the actual selection for adoption of the components. However, the dedicated circuit for an HD or CD disc or signal layer not being played or read can be set inactive by selecting either of HD and CD discs. It should also be noted that the whole dedicated circuit or a part thereof may be inactivated for the purpose of power saving.

That is to say, although in the aforementioned embodiment, when one of different digital signals is read, all the dedicated circuits for the other digital signals, including the optical pickup, RF amplifier and signal processing/DA converter, are controlled to stand in the power saving mode, the disc player according to the present invention may be designed such that some of the dedicated circuits for the other digital signals are controlled to take the power saving mode.

Furthermore, the present invention has been described in the foregoing concerning the disc player compatible with the HD, CD and hybrid (HD/CD) discs. Similarly, however, according to the present invention, it is possible to implement a disc player compatible of more than four-types of optical discs.

As having been described in the foregoing, the present invention provides a disc player adapted so that while a selected one of more than one type of audio optical disc having signals recorded thereon based on different optical recording methods, respectively, or while a selected one of more than one kind of audio signals is being read, power supply to the signal processing systems for the other types of discs or for the other kinds of signal is limited to allow the signal processing systems to stand in the power saving mode, whereby it is made possible to prevent an increased power consumption by the disc player 1 as a whole, which would otherwise take place, prevent a malfunction which would otherwise be caused by a portion of the disc player circuitry other than destined for the optical disc or signal not currently being played or read but being energized, and prevent occurrence of a noise which would otherwise come into the portion of the circuitry for the optical disc or signal being currently played or read.

What is claimed is:

1. A disc player for selective reading of a first digital signal of m quantization bits (m is an integer larger than or equal to 2) sampled with a sampling frequency Fs (Hz) and a second digital signal of one quantization bit sampled with a sampling frequency n Fs (Hz) (n times of the sampling frequency Fs (Hz); n is an integer larger than or equal to 2), the disc player comprising:

first means for processing the first digital signal;

second means for processing the second digital signal; and controlling means for providing, during reading of either the first digital signal or the second digital signal, a control to minimize a power consumption of the respective first means for processing or the second means for processing for the digital signal not being read.

2. The disc player as set forth in claim 1, wherein the controlling means minimizes the power consumption by reducing an operation clock signal for the respective first means for processing or the second means for processing for the digital signal not being read.

3. The disc player as set forth in claim 1, wherein the controlling means minimizes the power consumption by stopping an operation clock signal for the respective first means for processing or the second means for processing for the digital signal not being read.

4. The disc player as set forth in claim 1, wherein the controlling means minimizes the power consumption by shutting off a power supply to the respective first means for processing or the second means for processing for the digital signal not being read.

5. The disc player as set forth in claim 1, wherein the controlling means minimizes the power consumption by transferring a command for reducing an operation clock signal to the respective first means for processing or the second means for processing for the other digital signal not being read.

6. The disc player as set forth in claim 1, wherein the controlling means reduces the power consumption by transferring a command for stopping an operation clock signal to the respective first means for processing or the second means for processing for the digital signal not being read.

7. The disc player as set forth in claim 1, further comprising means for reading the first digital signal of the number m of quantization bits (m is an integer larger than or equal to 2) sampled with a sampling frequency Fs (Hz) from a disc-like recording medium.

8. The disc player as set forth in claim 1, further comprising means for reading the second digital signal of one quantization bit sampled with a sampling frequency n Fs (Hz) (n times of the sampling frequency Fs (Hz); n is an integer larger than or equal to 2) from a disc-like recording medium.

9. The disc player as set forth in claim 1, further comprising means for reading the first digital signal of the number m of quantization bits (m is an integer larger than or equal to 2) sampled with a sampling frequency Fs (Hz) from a first layer of a disc-like recording medium, and for reading the second digital signal of one quantization bit sampled with a sampling frequency n Fs (Hz) (n times of the sampling frequency Fs (Hz); n is an integer larger than or equal to 2) from a second layer of the disc-like recording medium.

10. A player for a disc-like recording medium including a first layer having recorded thereon a first digital signal of m quantization bits (m is an integer larger than or equal to 2)

sampled with a sampling frequency Fs (Hz) and a second layer having recorded thereon a second digital signal of one quantization bit sampled with a sampling frequency n Fs (Hz) (n times of the sampling frequency Fs (Hz); n is an integer larger than r equal to 2), the player comprising:

means for selecting either of the first layer or the second layer for reading a respective first signal or second signal therefrom;

first signal processing means for processing the first digital signal recorded on the first layer;

second signal processing means for processing the second digital signal recorded on the second layer; and controlling means for providing, during reading either the first digital signal recorded on the first layer or the second signal recorded on the second layer selected by the means for selecting, a control to minimize a power consumption of the respective first signal processing means or the second signal processing means for the digital signal recorded on the layer not being read.

11. The player as set forth in claim 10, wherein the controlling means minimizes the power consumption by reducing an operation clock signal for the respective first signal processing means or the second signal processing means for the digital signal not being read.

12. The player as set forth in claim 10, wherein the controlling means reduces the power consumption by stopping an operation clock signal for the respective first signal processing means or the second signal processing means for the digital signal not being read.

13. The player as set forth in claim 10, wherein the controlling means reduces the power consumption by shutting off a power supply to the respective first signal processing means or the second signal processing means for the digital signal not being read.

14. The player as set forth in claim 10, wherein the controlling means reduces the power consumption by transferring a command for reducing an operation clock signal to the respective first signal processing means or the second signal processing means for the digital signal not being read.

15. The player as set forth in claim 10, wherein the controlling means reduces the power consumption by transferring a command for stopping an operation clock signal to the respective first signal processing means or the second signal processing means for the digital signal not being read.

16. A disc playback method for selectively reading a first type of disc having recorded thereon a first digital signal of m quantization bits (m is an integer larger than or equal to 2) sampled with a sampling frequency Fs (Hz) and a second type of disc having recorded thereon a second digital signal of one quantization bit sampled with a sampling frequency n Fs (Hz) (n times of the sampling frequency Fs (Hz); n is an integer larger than or equal to 2), the method comprising the steps of:

discriminating a disc to be read from between the first and second types;

controlling, when the disc is judged to be the first type one, a signal processing system for the second digital signal to stand in a power saving mode and controlling, when the disc is judged to be the second type one, a signal processing system for the first digital signal to stand in the lower saving mode.

17. The method as set forth in claim 16, wherein a third type of disc is to be selectively read and further comprising the steps of:

discriminating a disc among the first type, second type, and a third type of disc having a first layer having recorded thereon a first digital signal of m quantization bits (m is an integer larger than or equal to 2) sampled with a sampling frequency Fs (Hz) and a second layer having recorded thereon a second digital signal of one quantization bit sampled with a sampling frequency n Fs (Hz) (n times of the sampling frequency Fs (Hz); n is an integer larger than or equal to 2);

discriminating, when the disc is judged to be the third type a layer to be read between the first and second layers;

controlling, when the layer to be read is judged to be the first type, a signal processing system for the second digit signal to stand in the power saving mode; and controlling, when the disc is judged to be the second type, a signal processing system for the first digital signal to stand in the power saving mode.

* * * * *